Dec. 29, 1925.  
R. SELIGMAN  
1,568,001  
FILTER OR STRAINER ESPECIALLY APPLICABLE TO MILK AND OTHER POTABLE LIQUIDS  
Filed May 13, 1925   4 Sheets-Sheet 1
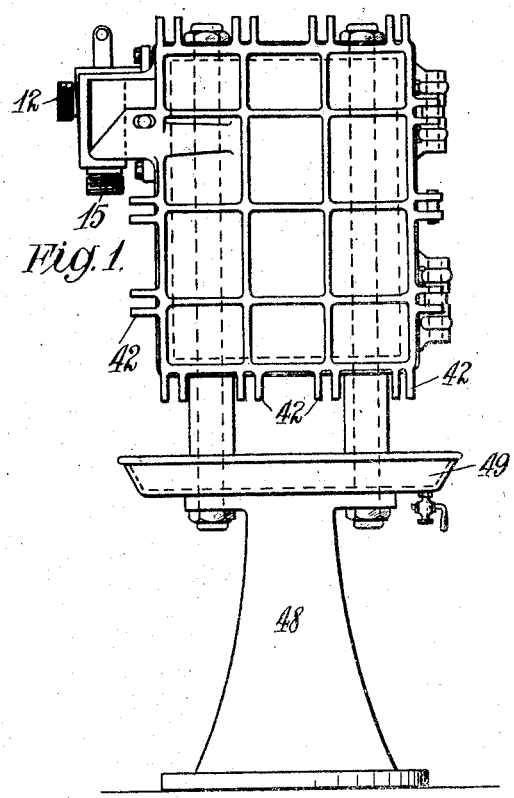
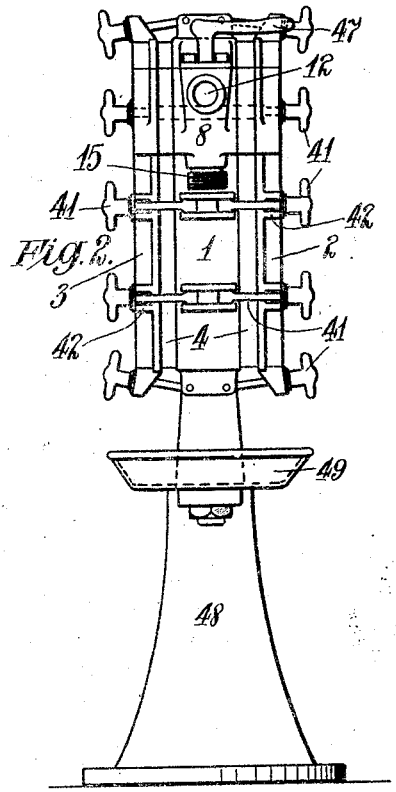
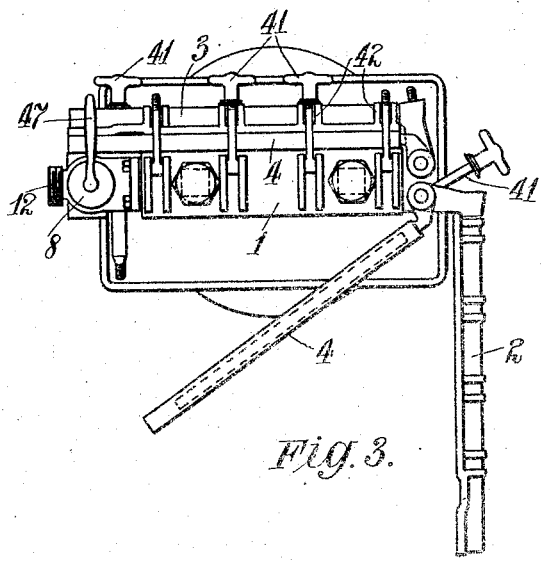
INVENTOR:
Richard Seligman.
ATTORNEY Dec. 29, 1925.
R. SELIGMAN
1,568,001
FILTER OR STRAINER ESPECIALLY APPLICABLE TO MILK AND OTHER POTABLE LIQUIDS
Filed May 13, 1925 4 Sheets-Sheet 2
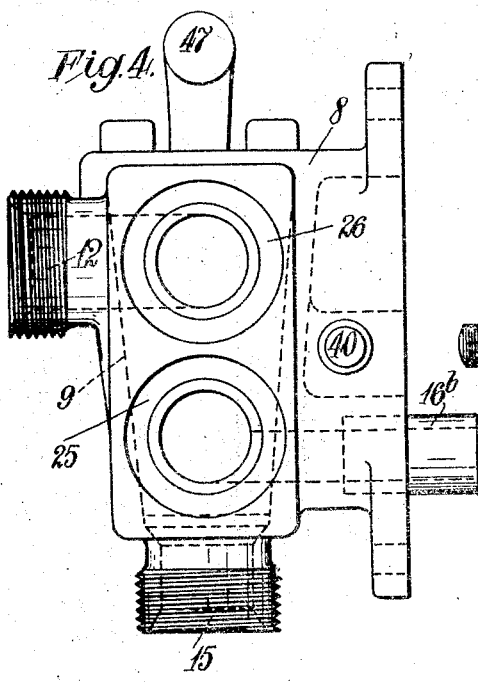
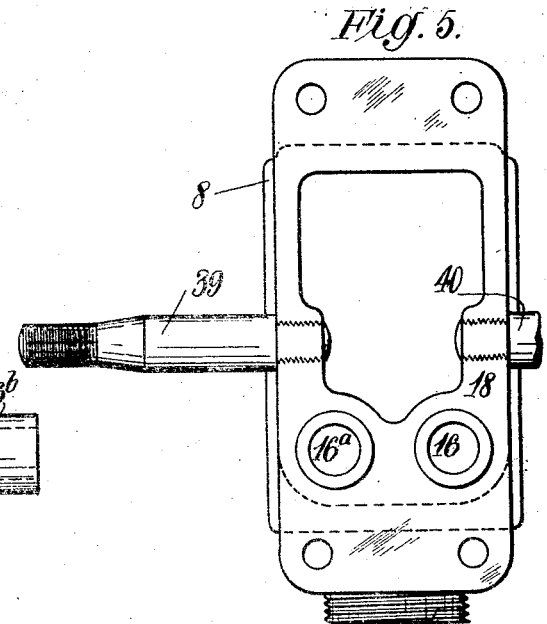
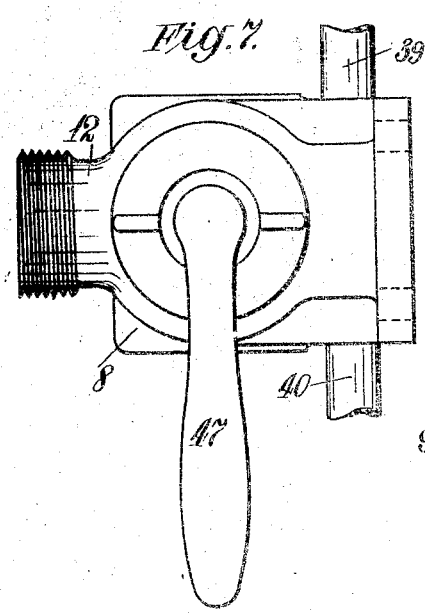
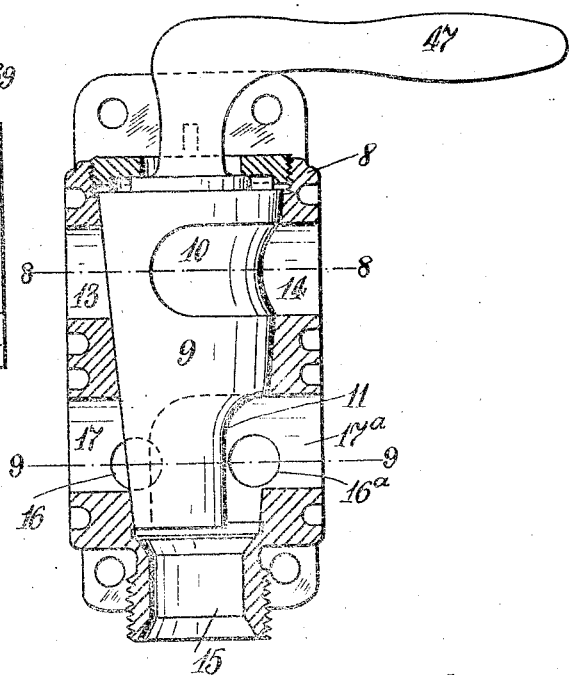
INVENTOR.
Richard Seligman.
ATTORNEY.

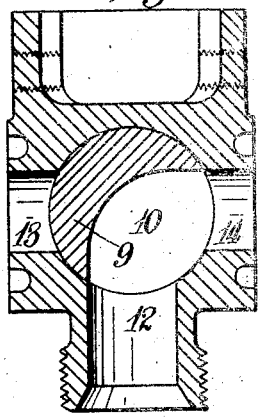
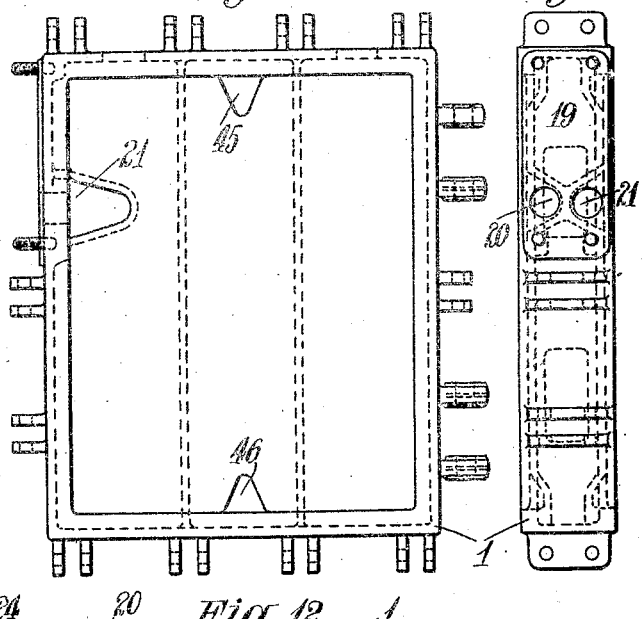
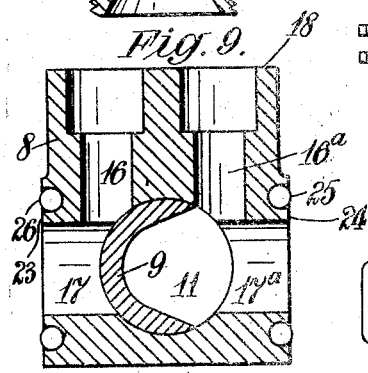
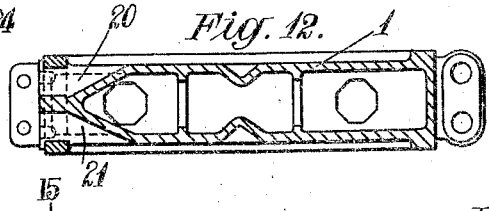
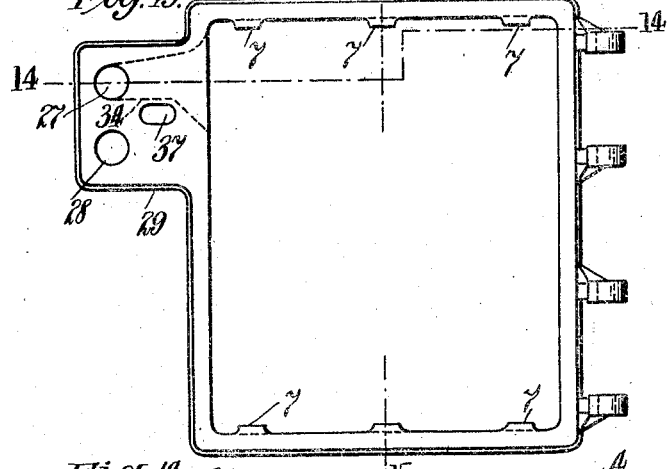
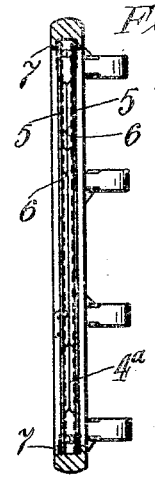
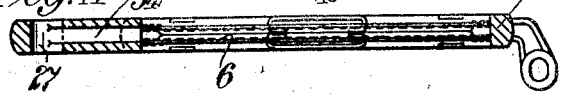

Dec. 29, 1925.  
R. SELIGMAN  
1,568,001  
FILTER OR STRAINER ESPECIALLY APPLICABLE TO MILK AND OTHER POTABLE LIQUIDS  
Filed May 13, 1925  
4 Sheets-Sheet 4
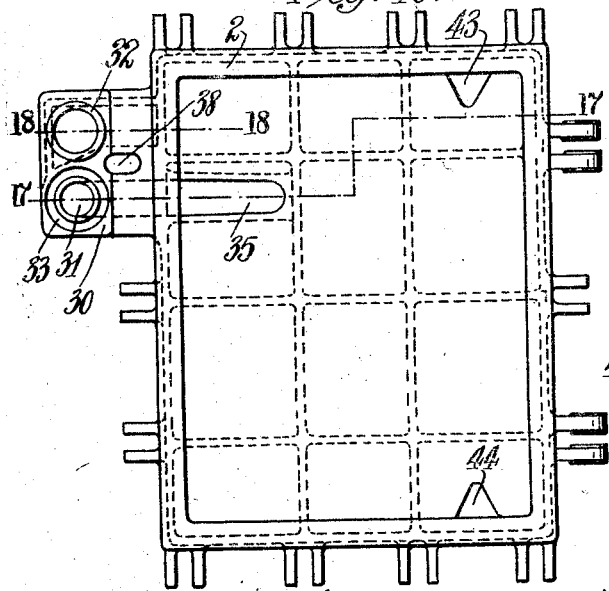
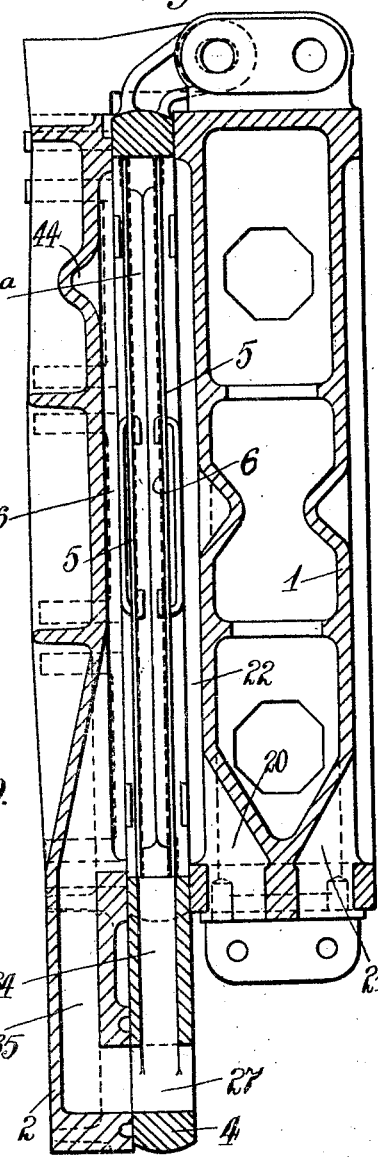
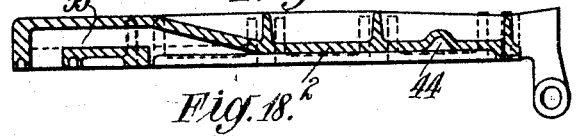
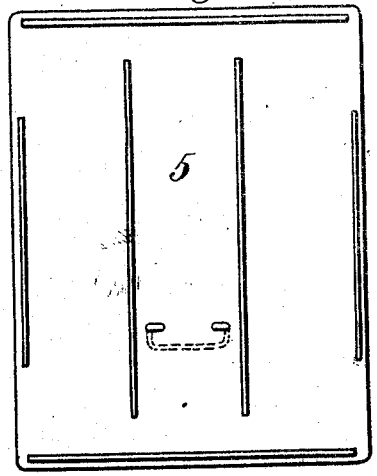
INVENTOR:
Richard Seligman
ATTORNEY.

Patented Dec. 29, 1925.

1,568,001

UNITED STATES PATENT OFFICE.

RICHARD SELIGMAN, OF LONDON, ENGLAND.

FILTER OR STRAINER ESPECIALLY APPLICABLE TO MILK AND OTHER POTABLE LIQUIDS.

Application filed May 13, 1925. Serial No. 30,055.

*To all whom it may concern:*

Be it known that I, RICHARD SELIGMAN, a subject of the King of Great Britain, residing at London, England, have invented certain new and useful Improvements in Filters or Strainers Especially Applicable to Milk and Other Potable Liquids (for which I have filed application in Great Britain January 21, 1924, No. 1,675), of which the following is a specification.

The present invention which is particularly applicable to milk and other potable liquids, relates to an improved construction of filter or strainer which is broadly of the known kind in which two or more straining or filtering chambers are associated with a valve control by means of which a strainer or filter may be removed at desired intervals for changing or cleaning purposes without affecting the continuity of flow.

The present invention realizes a filter or strainer of this kind in a plate or plate and frame form which possesses notable advantages, conducing as it does to manufacturing and floor-space economies, strength, ease of changing and thorough cleaning, etc.

The present invention is illustrated in the accompanying drawings to which reference is hereinafter made in order that the present invention may be the more clearly understood.

In the drawings:—

Figs. 1, 2 and 3 are front, side and plan views respectively of a filter under the present invention.

Figs. 4 and 5 are side and back elevations respectively of a multi-way valve control of the filter.

Fig. 6 is a vertical section of the multi-way valve.

Fig. 7 is a plan view, and Fig. 8 is a section on the line 8—8 of Fig. 6, while Fig. 9 is a section on the line 9—9 of Fig. 6.

Fig. 10 is a front elevation of the filter body and Fig. 11 is a side elevation thereof looking in the direction of the outlets.

Fig. 12 is a horizontal section of the filter body taken through the filter outlets.

Fig. 13 is a front elevation of one of the filter frames, Fig. 14 is a section taken on the line 14—14 of Fig. 13 and Fig. 15 is a section taken on the line 15—15 of Fig. 13.

Fig. 16 is a front elevation of one of the doors, Fig. 17 is a section on the line 17—17 and Fig. 18 is a section taken on the line 18—18 of Fig. 16.

Figs. 19 and 20 are front and side elevations of one of the filter plates associated with the filter frames.

Fig. 21 is an assemblage of the sections according to Figs. 12, 14 and 17 of one side of the filter body comprising the filter body the filter frame and the door, the multi-way valve not however being shown.

As illustrated the apparatus takes the form of a medial plate or body 1 to which are hinged or otherwise connected two movable plates or doors 2, 3, one on each side. While these plates 2, 3 may be recessed to take the filtering medium it is preferred as shown that the filtering medium shall be carried on a loose frame 4 interposed between the body 1 and each of the movable plates or doors 2, 3.

The frame 4 is fitted with removable perforated plates 5 (Figs. 19 and 20) one on each side which clamps an appropriate filter cloth 6 in the frame 4, the filter cloth 6 being usually a single piece folded to lie against the perforated plates 5 which are so arranged as to be capable of passing obliquely between the marginal overhangs 7 on the frame 4 and to clamp the cloth therein and provide a filter chamber 4ª between the perforated plates 5.

Any connection of the feed or the discharge pipe to the cover which would necessitate the breaking of pipe joints each and every time the filter is opened is avoided by conducting the filtrate back to the fixed plate by means of suitable communicating ports on the outside and medial plates. These ports may connect with a second multiway cock on the medial plate. The two cocks may be operated by a single lever.

Thus on an edge face of the body 1, the edge face parallel to the hinge and at or near the corresponding top corner serves well, is secured the body 8 of a multi-way valve 9 the construction whereof is as follows:—

The body 8 is adapted to take a taper plug valve 9 having ports 10 and 11 above one another therein, and is provided with an inlet 12 associated with branches 13, 14, and an outlet 15 associated with branches 16, 16ᵃ and 17, 17ᵃ, the port 10 controlling the flow to either of the branches 13, 14 separately, and the port 11 controlling the flow from either of the branches 16, 17 and 16ᵃ, 17ᵃ separately, according to the setting of the cock 9.

The branches 16, 16ᵃ lead out of the valve body 8 through the face 18 which contacts against the edge face 19 of the filter body 1, and these branches 16, 16ᵃ are connected such as by tubular pieces 16ᵇ to passages 20, 21 (Fig. 11) in the filter body 1, each of which passages lead to a corresponding chamber 22 provided between the filter frame 4 and the filter body 1 on each side thereof.

The branches 17, 17ᵃ, and the branches 13, 14 lead out of the valve body 8 in opposite directions through faces 23, 24 parallel to the plane of the filter, and joint rings or like 25, 26 are provided at each face 23, 24 to make a fluid tight connection of such branches 17, 17ᵃ and 13, 14 with ports 27, 28 in an offset 29 with which each of the filter frames 4 is provided in the plane thereof.

The doors 2, 3, each have a similar offset 30 provided with a single port 31 and with joint rings 32, 33 to blind fluid tight the port 27 in the filter frame offset 29 and to make a fluid tight connection of the port 31 with the port 28 in the filter frame offset 29.

A passage 34 leads from the port 27 of each filter frame 4 into the filter chamber 4ᵃ, and a passage 35 leads from the port 31 of each door 2, 3, into a corresponding chamber 36 formed between the filter frame 4 and the door associated therewith.

In this way the path of the liquid may be directed by the valve 9 to either side of the body 1 separately, the path followed being inlet 12, port 10, branch 13 or 14, port 27, passage 34, filter chamber 4ᵃ, where the flow divides, one branch flow following passage 35, port 28, (below 27) and branches 17 or 17ᵃ from chamber 36, and the other branch flow following pasage 20 or 21, and branch 16 or 16ᵃ from chamber 22, the divided flow then rejoining to pass out of the outlet 15.

Obviously the path of the liquid may be reversed if desired by making inlet through 15 and outlet through 12.

The filter frames and doors are shown as hinged to the body by offset leaves so as to open and close like doors or flaps, and slots 37, 38 are provided in the offsets 29, 30 of the filter frames and doors to permit these offsets to be fluid tightly clamped up to the valve faces 23, 24 by screw-nutted bolts 39, 40.

The filter body and filter frames and doors may conveniently and advantageously be clamped fluid tightly together with or without suitable packing by a system of swing screw-nutted bolts 41, and lug-pairs 42.

Suitable top and bottom recesses 43, 44 and 45, 46 may be provided in the doors and body respectively for taking discharge and vent cocks if necessary for completely emptying either filter when this is uncircuited.

The valve 9 is shown as operated by a single hand lever 47.

It will generally for ordinary use be convenient to mount the filter upon an appropriate pedestal 48 which is provided with a drip tray 49.

What I claim is:—

1. In a filter of the character described, in combination, a fixed medial plate-like body, cover plates one on each side of said plate-like body forming filter chambers therebetween, filtering media contained between the body and the cover plates and dividing the space between the body and each said cover plate into a filtered liquid-space and an unfiltered liquid-space, and a multi-way valve on the body, said valve connecting with the filter chambers through the body and through projections from the cover plates for controlling the supply and discharge of the liquid through one or other of the said filters.

2. In a filter of the character described, in combination, a fixed medial plate-like body, cover plates one on each side of said plate-like body forming filter chambers therebetween, filtering media contained between the body and the cover plates and dividing the space between the body and each said cover plate into a filtered liquid-space and an unfiltered liquid-space, and a multi-way valve on the body in the plane thereof, said valve connecting with the filter chambers through the body and through projections from the cover plates for controlling the supply and discharge of the liquid through one or other of the said filters.

3. In a filter of the character described, in combination, a fixed medial plate-like body, cover plates one on each side of said plate-like body forming filter chambers therebetween, filtering media contained and supported between the body and the cover plates and dividing the space between the body and each said cover plate into a liquid-space between said filtering media and liquid-spaces exterior to said filtering media, and a multi-way valve on the body in the plane thereof, said valve connecting with the filter chambers through the body and through projections from the cover plates for controlling the supply and discharge of the liquid through one or other of the said filters.

4. In a filter of the character described, in combination, a fixed medial plate-like body, cover plates one on each side of said plate-like body forming filter chambers therebetween, frames between said body and said cover plates, filtering media contained between said body and said cover plates and carried by said frames and dividing the space between the body and each said cover plate into a filtered liquid-space and an unfiltered liquid-space, and a multi-way valve on the body in the plane thereof, said valve connecting with the filter chambers through the body and through projections from the cover plates for controlling the supply and discharge of the liquid through one or other of the said filters.

5. A filter or strainer of the class referred to, comprising in combination a body in the form of a fixed medial plate-like unit, flat filtering surfaces one on each side of said body, a movable covering plate for each of said filtering surfaces, a multi-way cock for directing the liquid through one or the other of said filters and for discharging the liquid from the said filters, said cock being operated by a common control.

6. A filter or strainer of the class referred to, comprising in combination a body in the form of a fixed medial plate-like unit, flat filtering surfaces one on each side of said body, a movable covering plate for each of said filtering surfaces, controlling means for directing the liquid through one or the other of said filters, said means projecting in the plane of the body, and projections from the outside plates having appropriate connecting eyes and passages making fluid-tight clamping connection with said controlling means.

In testimony whereof, I affix my signature.

RICHARD SELIGMAN.